(12) United States Patent
Wakao et al.

(10) Patent No.: US 7,618,545 B2
(45) Date of Patent: Nov. 17, 2009

(54) METHOD FOR TREATING SHIP BALLAST WATER

(75) Inventors: Yoshiharu Wakao, Osaka (JP); Takuro Tabuchi, Osaka (JP); Takashi Mizumori, Osaka (JP)

(73) Assignee: Katayama Chemical, Inc., Osaka-shi (JP)

( * ) Notice: Subject to any disclaimer, the term of this patent is extended or adjusted under 35 U.S.C. 154(b) by 237 days.

(21) Appl. No.: 10/567,682

(22) PCT Filed: Jun. 17, 2005

(86) PCT No.: PCT/JP2005/011167

§ 371 (c)(1),
(2), (4) Date: Feb. 9, 2006

(87) PCT Pub. No.: WO2006/011315

PCT Pub. Date: Feb. 2, 2006

(65) Prior Publication Data

US 2006/0289364 A1    Dec. 28, 2006

(30) Foreign Application Priority Data

Jul. 30, 2004    (JP)    ............................. 2004-224403
Aug. 23, 2004    (JP)    ............................. 2004-242422

(51) Int. Cl.
*C02F 1/76*    (2006.01)
*C02F 1/72*    (2006.01)

(52) U.S. Cl. ...................... 210/753; 210/758; 210/759; 210/763; 210/764

(58) Field of Classification Search ................. 210/759, 210/93, 757, 762, 764, 749, 753, 758, 763; 252/186.3; 114/125; 42/28, 37
See application file for complete search history.

(56) References Cited

U.S. PATENT DOCUMENTS 4,612,124 A    9/1986    Escrig 5,256,423 A    10/1993    Egusa et al.
5,256,701 A *  10/1993    Tamura et al. ............... 424/670

FOREIGN PATENT DOCUMENTS

| EP | 0 147 795 A1 | 7/1985 |
|----|---|---|
| JP | 1-94997 A | 4/1989 |
| JP | 3-28101 A | 2/1991 |
| JP | 4-322788 A | 11/1992 |
| JP | 5-910 A | 1/1993 |
| JP | 8-91288 A | 4/1996 |
| JP | 2695071 B2 | 9/1997 |
| JP | 2000-507153 A | 6/2000 |
| JP | 2001-974 A | 1/2001 |
| JP | 2002-86155 A | 3/2002 |
| JP | 2002-234487 A | 8/2002 |
| JP | 2003-334563 A | 11/2003 |
| JP | 2004-42040 A | 2/2004 |
| JP | 2004-160437 A | 6/2004 |

OTHER PUBLICATIONS

Ikuta, et al., Biofouling Control Using a Synergistic Hydrogen Peroxide and Ferrous Ion Technique, 49th Annual Meeting, International Water Conference, 1998.*
The Merck Index, 14th ed., Monograph No. 01900 (web accessed).*
Machine translation of JP 2002-086155, Keisuke et al.*
Derwent abstract for JP 01-01094997, Fujino K, 1989.*
Derwent abstract for JP 2002086155, Nakamura K; 2002.*

* cited by examiner

*Primary Examiner*—Matthew O Savage
*Assistant Examiner*—Lucas Stelling
(74) *Attorney, Agent, or Firm*—Oblon, Spivak, McClelland, Maier & Neustadt, L.L.P.

(57) ABSTRACT

A method for treating ship ballast water in which organisms viable in the ship ballast water are exterminated by adding to the ship ballast water hydrogen peroxide or a compound producing hydrogen peroxide in an amount such that a hydrogen peroxide concentration comes to be 10 to 500 mg/L and at least one type selected from a ferrous ion or a compound supplying ferrous ion in an amount such that a ferrous ion concentration comes to be 0.1 to 400 mg/L, catalase in an amount such that a concentration of catalase comes to be 0.5 to 2,500 unit/L and iodine or a compound supplying iodine amount such that an iodine concentration comes to be 0.1 to 100 mg/L.

19 Claims, No Drawings

METHOD FOR TREATING SHIP BALLAST WATER

TECHNICAL FIELD

The present invention relates to a method for treating ship ballast water capable of exterminating various types of organisms viable in the ship ballast water in a convenient sure manner.

BACKGROUND ART

When a ship is loaded no cargo or a small cargo, the ship becomes difficult to maintain its equilibrium because of a water line is lowered. Therefore, such a ship is loaded with fresh water or seawater as ballast water to maintain its equilibrium thereby assuring safe navigation thereof in the ocean. The ballast water is taken in the ship at an unloading port before shipment and is discharged outside the ship before the ship comes into a loading port or at the time of loading a cargo.

The fresh water or the seawater as the ballast water is taken in a watertight compartment constituted inside the ship by a pump or the like and held there. On this occasion, various types of microorganisms such as plankton and bacteria and aquatic organisms such as minute shells viable in an intake area are taken in. By discharging such ballast water as described above, for example, along the coast near the loading port or in the loading port, there is caused a problem of damaging ecosystems in a surrounding ocean area. Further, since the ballast water is held for a long period of time in a closed light-shielded condition, an amount of dissolved oxygen is decreased. By discharging such ballast water as having a poor oxygen (reducing) condition, there is caused a concern as to whether a deleterious effect is given to organisms in the surrounding ocean area.

As described above, since the ballast water is held for a long period of time in a dark reducing condition, plankton or aerobic bacteria which require light or dissolved oxygen are hardly viable in the ballast water and cyst in which plankton is in a dormant state or anaerobic bacteria tend to grow. As for the cyst, an exterior wall thereof is completely different from a cell wall membrane of the plankton, has an extremely hard structure and, then, has an extremely high durability.

Under these circumstances, the present applicant has proposed a method for destroying cyst of noxious plankton by maintaining such an amount of hydrogen peroxide or a compound producing hydrogen peroxide as being effective in destroying the cyst of the noxious plankton in ship ballast water (Japanese Examined Patent Publication No. 2695071: Patent Document 1).

Further, there has been proposed a method for sterilizing ship ballast water by killing cyst of noxious algae by adding a chlorine type biocide or hydrogen peroxide to the ship ballast water (Japanese Unexamined Patent Publication No. HEI 4(1992)-322788: Patent Document 2). However, in a case in which the chlorine type biocide is added, a trihalomethane is generated in the ship ballast water, to thereby generate a concern about an environmental problem.

Further, there has been proposed a method of adding metallic powder such as iron powder as an antioxidant such that a concentration of dissolved oxygen and/or carbon dioxide is reduced to a level at which organisms viable in the ship ballast water are no more capable of being viable (Japanese kohyo No. 2000-507153: Patent Document 3). However, when the concentration of the dissolved oxygen in the ship ballast water is reduced to a level at which the organisms are incapable of being viable, by discharging the ship ballast water, there is caused a concern as to whether a deleterious effect is given to organisms in the surrounding ocean area.

On the other hand, there have been proposed various types of other methods for exterminating organisms in the ship ballast water than those of adding chemicals. For example, a method in which an electrode is disposed in a ballast tank and, then, electricity is turned on (Japanese Unexamined Patent Publication No. 2001-974: Patent Document 4), a method in which a pair of electrodes are disposed in a passage of ship ballast water and, then, an electric field is generated (Japanese Unexamined patent Publication No. 2003-334563: Patent Document 5), a method in which ship ballast water is heated for a given length of time (Japanese Unexamined Patent Publication No. HEI 8(1996)-91288: Patent Document 6), a method in which a nitrogen gas is supplied in ship ballast water tank (Japanese Unexamined Patent Publication No. 2002-234487: Patent Document 7) and a method in which steam is injected in ship ballast water tank, the steam and ozone are injected in the ship ballast water tank, or an ultraviolet ray is irradiated while injecting the steam (Japanese Unexamined Patent Publication No. 2004-160437: Patent Document 8) are known. However, each of these methods requires an apparatus of large scale and, accordingly, it is practically difficult to apply any of these methods to an existing ship.

Patent Document 1: Japanese Examined Patent Publication No. 2695071
Patent Document 2: Japanese Unexamined Patent Publication No. HEI 4(1992)-322788
Patent Document 3: Japanese kohyo No. 2000-507153
Patent Document 4: Japanese Unexamined Patent Publication No. 2001-974
Patent Document 5: Japanese Unexamined Patent Publication No. 2003-334563
Patent Document 6: Japanese Unexamined Patent Publication No. HEI 8(1996)-91288
Patent Document 7: Japanese Unexamined Patent Publication No. 2002-234487
Patent Document 8: Japanese Unexamined Patent Publication No. 2004-160437

DISCLOSURE OF INVENTION

Problems that the Invention is to Solve

It is an object of the present invention to provide a method for treating ship ballast water, which can exterminate various types of organisms viable in the ship ballast water, namely, zooplankton, phytoplankton, cyst in which plankton is in a dormant state, microorganisms such as bacteria and an aquatic organism such as a minute shell in a convenient sure manner, does not allow a chemical component to remain in the treated ship ballast water, can safely discharge the ship ballast water, allows an amount of dissolved oxygen in the ship ballast water to be appropriate, does not give any deleterious effect to organisms viable in the surrounding ocean area in which the ship ballast water is discharged and has a high degree of safety.

Means for Solving the Problems

The present inventors, as a result of eager studies to solve the above object, have found that all organisms viable in ship ballast water can be exterminated by adding to the ship ballast water hydrogen peroxide or a compound producing hydrogen peroxide and at least one type selected from a ferrous ion or a compound supplying ferrous ion, catalase and iodine or a compound supplying iodine in a specified concentration and, then, allowing hydrogen peroxide to be in contact with the ship ballast water and also have unexpectedly found that the dissolved oxygen in the ship ballast water can be maintained in an appropriate amount, to thereby achieve the present invention.

Thus, the present invention provides a method for treating ship ballast water in which organisms viable in the ship ballast water are exterminated by adding to the ship ballast water hydrogen peroxide or a compound producing hydrogen peroxide in an amount such that a hydrogen peroxide concentration comes to be 10 to 500 mg/L and at least one type selected from a ferrous ion or a compound supplying ferrous ion in an amount such that a ferrous ion concentration comes to be 0.1 to 400 mg/L, catalase in an amount such that a concentration of catalase comes to be 0.5 to 2,500 unit/L and iodine or a compound supplying iodine in an amount such that an iodine concentration comes to be 0.1 to 100 mg/L.

Effect of the Invention

According to the present invention, various types of organisms viable in the ship ballast water, namely, zooplankton, phytoplankton, cyst in which plankton is in a dormant state, microorganisms such as bacteria and an aquatic organism such as a minute shell can be exterminated in a convenient sure manner. Further, according to the present invention, a chemical thus added is not allowed to remain in the treated ship ballast water, an amount of dissolved oxygen in the ship ballast water is appropriate, any deleterious effect is not given to organisms viable in the surrounding ocean area, and the ship ballast water which has become unnecessary can be discharged into the sea at ease.

BEST MODE FOR CARRYING OUT THE INVENTION

Hydrogen peroxide is a secure compound capable of being easily decomposed into water and oxygen in water.

As for hydrogen peroxide to be used in the present invention, a hydrogen peroxide solution ordinarily having a concentration of from 3 to 60% which is commercially available as an industrial grade, further a concentration of 25 to 35% is preferred in safety and treatments.

The term "a compound producing hydrogen peroxide" (referred to also as "a compound supplying hydrogen peroxide") as used herein means a compound capable of producing hydrogen peroxide in water and includes inorganic peracids such as perboric acid, percarbonic acid and peroxysulfuric acid, organic peracids such as peracetic acid, and per salts thereof. As for such salts, sodium perborate and sodium percarbonate are mentioned.

At the time of adding any one of these compounds into the ship ballast water, hydrogen peroxide or the compound producing hydrogen peroxide (hereinafter, referred to also as "hydrogen peroxides") may appropriately be diluted or dissolved by seawater or fresh water so as to be in a desired concentration, and then, used.

Further, hydrogen peroxide produced in water including seawater or fresh water can also be used. As for a method of producing hydrogen peroxide in water, a method of electrochemically decomposing water or an alkaline solution, a method of irradiating a high-energy ray such as an ultraviolet ray or a radiation ray or a method of metabolism of an aquatic organism for example "*Poecillia vellifere*" can be mentioned.

As for the ferrous ion or the compound supplying ferrous ion (hereinafter, referred to also as "ferrous ions"), compounds, such as ferrous sulfate, ferrous chloride and ammonium ferrous sulfate, capable of being dissolved in water and capable of forming a divalent iron ion in water can be mentioned.

At the time of adding any one of these compounds into the ship ballast water, the ferrous ions may appropriately be diluted or dissolved by seawater or fresh water so as to be in a desired concentration, and then, used.

Catalase to be used in the present invention is an enzyme which catalyzes a reaction of decomposing hydrogen peroxide and is present rich in a liver, a kidney and blood erythrocytes of animals such as a cow and a pig. Further, catalase can be obtained also by culturing bacteria such as *Aspergillus niger* and *Micrococcus lysodeikticus*. According to the present invention, an extract, culture or culture extract can be used, and the refined or unrefined one may be used. Further, the molecular weight thereof is preferably from about 100,000 to about 500,000, and the activity thereof is preferably from about 10,000 to about 100,000 unit/mL.

At the time of adding any one of these articles into the ship ballast water, catalase may appropriately be diluted or dissolved by seawater or fresh water so as to be in a desired concentration, and then, used.

The term "a compound supplying iodine" as used herein means a compound which is soluble in water and can form an iodine ion in water and includes potassium iodide and ammonium iodide.

At the time of adding any one of these compounds into the ship ballast water, iodine or the compound supplying iodine (hereinafter, referred to also as "iodines") may appropriately be diluted or dissolved by seawater or fresh water so as to be in a desired concentration, and then, used.

The method according to the present invention is performed by adding hydrogen peroxides of such an amount as a concentration of hydrogen peroxide comes to be 10 to 500 mg/L and, preferably, 10 to 300 mg/L and at least one type selected from among ferrous ions of such an amount as a concentration of the ferrous ion comes to be 0.1 to 400 mg/L and, preferably, 0.1 to 100 mg/L, catalase of such an amount as a concentration of the catalase comes to be 0.5 to 2500 unit/L and, preferably, 0.5 to 250 unit/L and iodines such an amount as a concentration of the iodine comes to be 0.1 to 100 mg/L and, preferably, 0.1 to 10 mg/L, into the ship ballast water.

In case of the activity of the catalase is 50000 unit/mL, the amount as a concentration of the catalase preferably comes to be 0.01 to 50 mg/L.

In a case in which the concentration of hydrogen peroxide is less than 10 mg/L, the organisms viable in the ballast are not sufficiently exterminated; accordingly, the case is not preferred. Further, in a case in which the concentration of hydrogen peroxide is more than 500 mg/L, the effect of extermination of the organisms corresponding to the quantity thereof to be added can not be expected and, still further, since hydrogen peroxide sometimes remains after treating the ship ballast water, the case is not preferred.

On the other hand, in a case in which the concentration of the ferrous ion is less than 0.1 mg/L, the concentration of catalase is less than 0.5 unit/L or the concentration of iodine is less than 0.1 mg/L, not only it takes time in decomposing hydrogen peroxide, but also ability of maintaining the concentration of the dissolved oxygen is decreased; accordingly this case is not preferred. Further, in a case in which the concentration of the ferrous ion is more than 400 mg/L, the concentration of catalase is more than 2500 unit/L, or the concentration of iodine is more than 100 mg/L, the effect corresponding to such addition amount can not be expected, which not only causes the economical demerit, but also decreases the effect of exterminating the aquatic organisms; accordingly, this case is not preferred.

In a case in which the ferrous ions are added, iron hydroxide is produced and, on this occasion, the thus-produced iron hydroxide may be disposed of as sludge after the appropriate treatment; however, when the amount of the ferrous ions to be added is unduly large, the amount of iron hydroxides to be produced comes to be also large. Accordingly, this case is not preferred.

Further, in the method according to the present invention, it is preferably that hydrogen peroxides having the hydrogen peroxide concentration of 10 to 500 mg/L is allowed to come in contact with the ship ballast water for 3 to 40 hours.

The organisms viable in the ship ballast water, particularly, cyst having a strong durability can surely be exterminated by allowing hydrogen peroxide to come in contact with the ship ballast water for the above-described period of time.

The period of time in which hydrogen peroxide is allowed to come in contact with the ship ballast water may appropriately be selected depending on the concentration of each chemical at the time of being added, the temperature of the ship ballast water, types or amounts of organisms viable in the ship ballast water. Ordinarily, in a case in which the concentration of the chemical to be added is low, hydrogen peroxide is allowed to come in contact with the ship ballast water for a longer period of time, while, in a case in which the concentration of the chemical to be added is high, hydrogen peroxide is allowed to come in contact with the ship ballast water for a shorter period of time. In a case in which the time period for allowing hydrogen peroxide to come in contact with the ship ballast water is less than 3 hours, the organisms viable in the ship ballast water are not sufficiently exterminated; accordingly, this case is not preferred. Further, even in a case in which the time period for allowing hydrogen peroxide to come in contact with the ship ballast water is more than 40 hours, the effect corresponding to such period can not be expected; accordingly, this case is not preferred. Still further, in a case in which the temperature of the ship ballast water is as low as 15° C. or less, it is preferable to perform the treatment at a high concentration for a long period of time.

Ordinarily, ships require from 1 to 2 weeks or more in ocean-going navigation while it requires from several hours to several tens of hours in navigation in the seas close to Japan. Therefore, the concentration of the chemical to be added or contact period of the chemical may appropriately be selected in accordance with the navigation period of time or the temperature of the ship ballast water.

Namely, the amount to be added and the contact period of hydrogen peroxide may be defined in the above-described range on the basis of capability of exterminating the cyst which is conceivably most difficult to be exterminated among organisms viable in the ship ballast water while taking into consideration the temperature of the ship ballast water and the navigation period of time of the ship.

Further, the amount to be added of at least one type selected from the ferrous ion, catalase and iodines to be simultaneously used may be defined on the basis of the amount capable of decomposing the thus-added hydrogen peroxides at the time of discharging the ship ballast water while taking into consideration maintaining a dissolved oxygen concentration in the ship ballast water during navigation.

Still further, the method according to the present invention can be performed by appropriately combining with the existing methods for treating ship ballast water, for example, cavitation, shear strength, steam injection and ultraviolet ray irradiation.

EXAMPLES

The present invention will be hereinafter described in detail with reference to the test examples as described below, but these examples are not to be construed to limit the scope of the invention.

Test Example 1

Test for Confirming the Ability of Maintaining Dissolved Oxygen Concentration in Seawater Incubating glass bottles were each filled with 100 mL of seawater (pH: 8.04; temperature: 24.7° C.; and salt concentration: 3.17%) collected at a given place in Osaka Bay and, with addition of hydrogen peroxide (reagent: aqueous 30% by weight solution) and/or peracetic acid (reagent: containing 9% by weight; containing 1% by weight of hydrogen peroxide) and ferrous sulfate (reagent: 7 hydrates), catalase ("Asksuper"; the activity 50,000 unit/ml; available from Mitsubishi Gas Chemical Co., Inc.) or potassium iodide as test chemicals in the respective concentrations as described in Table 1 and, thereafter, left to stand still in a thermostatic oven set at 25° C. in a dark condition. The dissolved oxygen concentration (mL/L) in seawater was measured along the passage of time from the time of addition of the chemical, by using the dissolved oxygen meter (Model: E-1035; available from Iijima Electronics Corp.), The 3 test bodies per condition were measured and an average value thereof was obtained. The thus-obtained results are shown in Table 1.

TABLE 1

| Test chemical (mg/L) | | | | | Dissolved oxygen concentration (mL/L) | | | | |
| --- | --- | --- | --- | --- | --- | --- | --- | --- | --- |
| Hydrogen peroxide | Peracetic acid * | Ferrous sulfate ** | Catalase | Potassium iodide *** | Elapsed time (hr) | | | | |
| | | | | | 0 | 1 | 6 | 12 | 24 |
| 20 | — | 40(15) | — | — | 8.47 | 9.61 | 10.05 | 10.53 | 11.07 |
| 20 | — | 10(4) | — | — | 8.02 | 8.36 | 9.17 | 9.72 | 10.24 |
| 20 | — | 1(0.4) | — | — | 7.80 | 8.07 | 8.76 | 8.98 | 9.40 |
| 20 | — | — | 20 | — | 16.27 | 16.55 | 15.05 | 14.06 | 13.86 |
| 20 | — | — | 2 | — | 9.05 | 11.65 | 14.97 | 15.25 | 15.38 |
| 20 | — | — | 0.2 | — | 7.42 | 8.07 | 9.82 | 10.87 | 12.56 |
| 20 | — | — | 0.02 | — | 7.21 | 7.79 | 8.79 | 9.65 | 10.27 |

TABLE 1-continued

| Test chemical (mg/L) | | | | | Dissolved oxygen concentration (mL/L) | | | | |
|---|---|---|---|---|---|---|---|---|---|
| Hydrogen peroxide | Peracetic acid * | Ferrous sulfate ** | Catalase | Potassium iodide *** | Elapsed time (hr) | | | | |
| | | | | | 0 | 1 | 6 | 12 | 24 |
| 20 | — | — | — | 13(10) | 7.42 | 7.71 | 8.61 | 9.84 | 10.90 |
| 20 | — | — | — | 1.3(0.1) | 7.39 | 7.55 | 8.62 | 9.29 | 10.12 |
| 20 | — | — | — | 0.13(0.01) | 7.74 | 8.05 | 8.64 | 8.99 | 9.34 |
| 20 | — | — | — | — | 7.12 | 7.43 | 7.94 | 8.09 | 8.32 |
| — | — | 40(15) | — | — | 6.23 | 5.81 | 5.13 | 4.78 | 4.51 |
| — | — | — | 20 | — | 7.03 | 7.23 | 7.33 | 7.19 | 7.15 |
| — | — | — | — | 13(10) | 6.94 | 7.21 | 7.28 | 7.20 | 7.13 |
| 20 | 6.7(3.7) | 10(4) | — | — | 8.12 | 8.35 | 9.12 | 9.60 | 10.62 |
| 20 | 6.7(3.7) | 1(0.4) | — | — | 8.02 | 8.17 | 8.74 | 8.91 | 9.55 |
| 20 | 20(11) | 10(4) | — | — | 8.23 | 8.43 | 9.15 | 9.57 | 10.70 |
| 20 | 20(11) | 1(0.4) | — | — | 8.13 | 8.28 | 8.90 | 9.00 | 9.72 |
| 20 | 6.7(3.7) | — | — | — | 7.35 | 7.44 | 7.77 | 8.02 | 8.48 |
| 20 | 20(11) | — | — | — | 7.42 | 7.55 | 7.71 | 8.09 | 8.56 |
| — | 20(11) | — | — | — | 6.85 | 6.94 | 7.09 | 7.02 | 6.89 |
| — | — | 10(4) | — | — | 6.42 | 6.35 | 6.25 | 6.02 | 5.41 |
| | | Blank | | | 6.60 | 6.94 | 6.42 | 5.91 | 5.51 |

* The value in parenthesis shows the conversion concentration of hydrogen peroxide.
** The value in parenthesis shows the ferrous ion concentration.
*** The value in parenthesis shows the iodine concentration.

From the results shown in Table 1, it is found that the dissolved oxygen concentration in a case in which hydrogen peroxide and/or peracetic acid, and one type selected from among ferrous sulfate, catalase and potassium iodide were simultaneously used can be maintained at a high value compared with a case in which hydrogen peroxide, peracetic acid, ferrous sulfate, catalase and potassium iodide are each singly used, another case in which hydrogen peroxide and peracetic acid are simultaneously used and still another case of blank (non-addition).

Test Example 2

Test for Confirming the Decomposition Property of Hydrogen Peroxide

Artificial seawater (trade name: Aquamarine; pH: 8.3; temperature: 25° C.; available from Yashima Yakuhin Co., Ltd.) was treated with a high temperature sterilization for 15 minutes at 121° C. To the thus-treated artificial seawater, hydrogen peroxide (reagent: aqueous 30% by weight solution) and/or peracetic acid (reagent: containing 9% by weight: containing 1% by weight of hydrogen peroxide) and ferrous sulfate (reagent: 7 hydrates), catalase ("Asksuper"; the activity 50,000 unit/ml; available from Mitsubishi Gas Chemical Co., Inc.) or potassium iodide were added as the test chemicals in the respective concentrations as described in Tables 2 to 4, to thereby obtain the test liquid. The thus-obtained test liquid were left to stand still in a thermostatic oven set at 25° C. and the hydrogen peroxide concentration (mg/L) in the test liquid was measured by using the potassium permanganate method along the passage of time from the time of addition of the chemicals. The thus-obtained results are shown in Tables 2 to 4.

TABLE 2

| Test chemical (mg/L) | | | Hydrogen peroxide concentration (mg/L) | | | | | |
|---|---|---|---|---|---|---|---|---|
| Hydrogen peroxide | Peracetic acid * | Ferrous sulfate ** | Elapsed time (hr) | | | | | |
| | | | 0 | 3 | 6 | 12 | 24 | 48 |
| 200 | — | 1.8(0.7) | 204 | 198 | 195 | 192 | 186 | 170 |
| 200 | — | 18(7) | 202 | 195 | 190 | 177 | 166 | 150 |
| 200 | — | 179(66) | 171 | 164 | 160 | 151 | 136 | 111 |
| 200 | — | 358(132) | 141 | 90 | 68 | 36 | 17 | 6 |
| 200 | — | 715(263) | 96 | 36 | 17 | 5 | 3 | 0 |
| 200 | — | 894(328) | 77 | 32 | 15 | 5 | 3 | 0 |
| 200 | — | — | 206 | 203 | 200 | 200 | 200 | 198 |
| 181 | 42(23.8) | 358(132) | 133 | 60 | 40 | 28 | 15 | 4 |
| 181 | 42(23.8) | 36(13) | 197 | 191 | 185 | 170 | 153 | 144 |
| 100 | 224(125) | 358(132) | 140 | 75 | 55 | 34 | 19 | 7 |
| 100 | 224(125) | 36(13) | 197 | 190 | 183 | 166 | 154 | 149 |
| 181 | 42(23.8) | — | 199 | 197 | 197 | 196 | 195 | 194 |
| 100 | 224(125) | — | 200 | 200 | 199 | 198 | 197 | 196 |

* The value in parenthesis shows the conversion concentration of hydrogen peroxide.
** The value in parenthesis shows the ferrous ion concentration.

TABLE 3

| Test chemical (mg/L) | | Hydrogen peroxide concentration (mg/L) |||||| 
|---|---|---|---|---|---|---|---|
| Hydrogen peroxide | Catalase | Elapsed time (hr) |||||| 
| | | 0 | 3 | 6 | 12 | 24 | 48 |
| 200 | 0.2 | 196 | 179 | 171 | 160 | 151 | 140 |
| 200 | 2 | 186 | 72 | 41 | 0 | — | — |
| 200 | 20 | 130 | 25 | 0 | — | — | — |
| 200 | — | 206 | 203 | 200 | 200 | 200 | 198 |

TABLE 4

| Test chemical (mg/L) | | Hydrogen peroxide concentration (mg/L) |||||| 
|---|---|---|---|---|---|---|---|
| Hydrogen peroxide | Potassium iodide * | Elapsed time (hr) |||||| 
| | | 0 | 3 | 6 | 12 | 24 | 48 |
| 200 | 0.13(0.1) | 190 | 179 | 165 | 130 | 89 | 54 |
| 200 | 1.3(1) | 182 | 170 | 152 | 102 | 67 | 45 |
| 200 | 13(10) | 178 | 167 | 145 | 88 | 49 | 23 |
| 200 | 130(100) | 165 | 150 | 128 | 70 | 30 | 0 |
| 200 | — | 206 | 203 | 200 | 200 | 200 | 198 |

* The value in parenthesis shows the iodine concentration.

From the results shown in Tables 2 to 4, it is found that, in a case in which hydrogen peroxide and/or peracetic acid, and one type selected from among ferrous sulfate, catalase and potassium iodide were simultaneously used, hydrogen peroxide is decomposed in accordance with the amounts of ferrous sulfate, catalase and potassium iodide to be added.

Test Example 3

Test for Confirming the Effect of Exterminating Cyst

Seawater collected at a given place in Osaka Bay was filtered by a membrane filter of 0.45 μm. To the thus-filtered seawater, hydrogen peroxide (reagent: aqueous 30% by weight solution) and/or peracetic acid (reagent: containing 9% by weight: containing 1% by weight of hydrogen peroxide) and ferrous sulfate (reagent: 7 hydrates), catalase ("Asksuper"; the activity 50000 unit/ml; available from Mitsubishi Gas Chemical Co., Inc.) or potassium iodide as the test chemicals in the respective concentrations as described in Tables 5 to 7 were added, to thereby obtain the test liquids. The each thus-obtained test liquid of 3 mL was taken in a watch glass of 7 cm diameter and also 10 individual cysts of *Alexandrium catenella* were added thereto by using a capillary and, then, after the cysts were allowed to be in contact with the test liquid for 3 hours, 24 hours and 48 hours, respectively, the cysts were taken out and, thereafter, were rinsed three times with the filtered seawater. The resultant cysts were put in multi-well plates by one cyst in one multi-well plate in each of which 1 mL of new filtered seawater was filled and incubated in a thermostatic oven set at from 22 to 25° C. The germination condition of the cyst was observed under a microscope along the passage of time from the start of the incubation. The obtained results are shown in Tables 5 to 7.

Further, in Table 8, the results of tests which have been performed in a similar manner as in the above except a case in which hydrogen peroxide is singly added and another case of no addition (blank) are shown.

TABLE 5

| Test chemical (mg/L) | | | Contact time with test chemical (hr) | Number of germinated cyst in each elapsed time (number) |||| 
|---|---|---|---|---|---|---|---|
| Hydrogen peroxide | Peracetic acid * | Ferrous sulfate ** | | 24 | 48 | 72 | 96 |
| 10 | — | 18(7) | 3 | 0 | 0 | 0 | 0 |
| | | | 24 | 0 | 0 | 0 | 0 |
| | | | 48 | 0 | 0 | 0 | 0 |
| 20 | — | 179(66) | 3 | 0 | 0 | 0 | 0 |
| | | | 24 | 0 | 0 | 0 | 0 |
| | | | 48 | 0 | 0 | 0 | 0 |
| 50 | — | 358(132) | 3 | 0 | 0 | 0 | 0 |
| | | | 24 | 0 | 0 | 0 | 0 |
| | | | 48 | 0 | 0 | 0 | 0 |
| 100 | — | 715(263) | 3 | 0 | 0 | 0 | 0 |
| | | | 24 | 0 | 0 | 0 | 0 |
| | | | 48 | 0 | 0 | 0 | 0 |
| 200 | — | 894(328) | 3 | 0 | 0 | 0 | 0 |
| | | | 24 | 0 | 0 | 0 | 0 |
| | | | 48 | 0 | 0 | 0 | 0 |
| 10 | 10(5.5) | 18(7) | 3 | 0 | 0 | 0 | 0 |
| | | | 24 | 0 | 0 | 0 | 0 |
| | | | 48 | 0 | 0 | 0 | 0 |
| 10 | 5(2.8) | 18(7) | 3 | 0 | 0 | 0 | 0 |
| | | | 24 | 0 | 0 | 0 | 0 |
| | | | 48 | 0 | 0 | 0 | 0 |
| 10 | 3(1.6) | 18(7) | 3 | 0 | 0 | 0 | 0 |
| | | | 24 | 0 | 0 | 0 | 0 |
| | | | 48 | 0 | 0 | 0 | 0 |

* The value in parenthesis shows the conversion concentration of hydrogen peroxide.
** The value in parenthesis shows the ferrous ion concentration.

TABLE 6

| Test chemical (mg/L) | | Contact time with test chemical (hr) | Number of germinated cyst in each elapsed time (number) |||| 
|---|---|---|---|---|---|---|
| Hydrogen peroxide | Catalase | | 24 | 48 | 72 | 96 |
| 10 | 0.2 | 3 | 1 | 1 | 1 | 1 |
| | | 24 | 0 | 0 | 0 | 0 |
| | | 48 | 0 | 0 | 0 | 0 |
| 20 | 2 | 3 | 0 | 0 | 0 | 0 |
| | | 24 | 0 | 0 | 0 | 0 |
| | | 48 | 0 | 0 | 0 | 0 |
| 50 | 2 | 3 | 0 | 0 | 0 | 0 |
| | | 24 | 0 | 0 | 0 | 0 |
| | | 48 | 0 | 0 | 0 | 0 |
| 100 | 20 | 3 | 0 | 0 | 0 | 0 |
| | | 24 | 0 | 0 | 0 | 0 |
| | | 48 | 0 | 0 | 0 | 0 |
| 200 | 200 | 3 | 1 | 1 | 2 | 2 |
| | | 24 | 1 | 1 | 1 | 2 |
| | | 48 | 1 | 1 | 2 | 2 |

TABLE 7

| Test chemical (mg/L) | | Contact time with test chemical (hr) | Number of germinated cyst in each elapsed time (number) |||| 
|---|---|---|---|---|---|---|
| Hydrogen peroxide | Potassium iodide * | | 24 | 48 | 72 | 96 |
| 10 | 0.13(0.1) | 3 | 0 | 1 | 1 | 1 |
| | | 24 | 0 | 0 | 0 | 0 |
| | | 48 | 0 | 0 | 0 | 0 |

TABLE 7-continued

| Test chemical (mg/L) | | Contact time with test chemical (hr) | Number of germinated cyst in each elapsed time (number) | | | |
|---|---|---|---|---|---|---|
| Hydrogen peroxide | Potassium iodide * | | 24 | 48 | 72 | 96 |
| 20 | 1.3(1) | 3 | 0 | 0 | 0 | 0 |
| | | 24 | 0 | 0 | 0 | 0 |
| | | 48 | 0 | 0 | 0 | 0 |
| 50 | 13(10) | 3 | 0 | 0 | 0 | 0 |
| | | 24 | 0 | 0 | 0 | 0 |
| | | 48 | 0 | 0 | 0 | 0 |
| 100 | 131(100) | 3 | 0 | 0 | 0 | 0 |
| | | 24 | 0 | 0 | 0 | 0 |
| | | 48 | 0 | 0 | 0 | 0 |
| 200 | 1310(1001) | 3 | 0 | 1 | 1 | 1 |
| | | 24 | 0 | 1 | 1 | 2 |
| | | 48 | 0 | 1 | 1 | 1 |

* The value in parenthesis shows the iodine concentration.

TABLE 8

| Test chemical (mg/L) Hydrogen peroxide | Contact time with test chemical (hr) | Number of germinated cyst in each elapsed time (number) | | | |
|---|---|---|---|---|---|
| | | 24 | 48 | 72 | 96 |
| 10 | 3 | 2 | 2 | 2 | 3 |
| | 24 | 1 | 1 | 2 | 2 |
| | 48 | 0 | 0 | 0 | 0 |
| 20 | 3 | 0 | 1 | 1 | 2 |
| | 24 | 0 | 0 | 0 | 0 |
| | 48 | 0 | 0 | 0 | 0 |
| 50 | 3 | 0 | 1 | 1 | 1 |
| | 24 | 0 | 0 | 0 | 0 |
| | 48 | 0 | 0 | 0 | 0 |
| 100 | 3 | 0 | 0 | 0 | 0 |
| | 24 | 0 | 0 | 0 | 0 |
| | 48 | 0 | 0 | 0 | 0 |
| 200 | 3 | 0 | 0 | 0 | 0 |
| | 24 | 0 | 0 | 0 | 0 |
| | 48 | 0 | 0 | 0 | 0 |
| Blank | — | 2 | 4 | 5 | 5 |

From the results shown in Tables 5 to 7, it is found that, when the specified amount of hydrogen peroxide and/or peracetic acid, and at least one type from among ferrous sulfate, catalase and potassium iodide were simultaneously used, the excellent effect of exterminating the cyst can be obtained.

Test Example 4

Test for Confirming the Effect of Exterminating Plankton

Seawater collected at a given place in Osaka Bay was filtered by a membrane filter of 0.45 μm. The thus-filtered seawater of 3 mL was put in a watch glass of 7 cm diameter and, then, a cyst of a selected *Alexandrium catenella* was added thereto by using a capillary. The watch glass is put in a petri dish and, then, the petri dish was covered with a filter paper soaked with pure water so as to seal and prevent drying. The thus-covered petri dish was left to stand still in a thermostatic oven set at 22° C. After being left to stand still for 96 hours, plankton which was germinated in the watch glass and swam normally, was collected by using the capillary.

On the other hand, hydrogen peroxide (reagent: aqueous 30% by weight solution) and/or peracetic acid (reagent: containing 9% by weight: containing 1% by weight of hydrogen peroxide), and ferrous sulfate (reagent: 7 hydrates), catalase ("Asksuper"; the activity 50000 unit/ml; available from Mitsubishi Gas Chemical Co., Inc.) or potassium iodide as shown in Tables 9 to 11 as the test chemicals, were added to new filtered seawater. The resultant filtered seawater of 1 mL was put in a multi-plate. Then, the thus-collected 10 individual planktons inoculated thereto and the planktons were allowed to be in contact with the filtered seawater for 1 hour or 24 hours in a thermostatic oven set at 22° C. Thereafter, the planktons were taken out and, then, rinsed three times with the filtered seawater. The resultant planktons were inoculated one by one in the multi-plate in which 1 mL of new filtered seawater was filled, and left to stand still in a thermostatic oven set at from 22° C. The behavior of the plankton was observed 24 hours after the inoculation. The results are shown in Tables 9 to 11.

Further, as for stationary individuals, in order to confirm as to whether they are temporarily motionless and, then, recovered or completely deceased, the stationary individual was transferred to a K medium which does not contain any chemical and incubated for further 24 hours in a thermostatic oven set at 22° C. and, subsequently, the individuals deposited in the bottom of the incubator was counted as the deceased individuals. Further, the individual which formed the cyst was excluded by judging as it was recovered. The results are shown in Tables 9 to 11.

Further, in Table 12, the results of tests which have been performed in a similar manner as in the above for a case in which hydrogen peroxide is singly added and another case of no addition (blank) are shown.

TABLE 9

| Test chemical (mg/L) | | | Contact time with test chemical (hr) | Behavior of plankton (number) | | Mortality of dormancy (number) | Death rate (%) |
|---|---|---|---|---|---|---|---|
| Hydrogen peroxide | Peracetic acid * | Ferrous sulfate ** | | Normal natation | Dormancy | | |
| 10 | — | 18(7) | 1 | 0 | 10 | 10 | 100 |
| | | | 24 | 0 | 10 | 10 | 100 |
| 20 | — | 179(66) | 1 | 0 | 10 | 10 | 100 |
| | | | 24 | 0 | 10 | 10 | 100 |
| 50 | — | 358(132) | 1 | 0 | 10 | 10 | 100 |
| | | | 24 | 0 | 10 | 10 | 100 |

TABLE 9-continued

| Test chemical (mg/L) | | | Contact time with test chemical (hr) | Behavior of plankton (number) | | Mortality of dormancy (number) | Death rate (%) |
| --- | --- | --- | --- | --- | --- | --- | --- |
| Hydrogen peroxide | Peracetic acid * | Ferrous sulfate ** | | Normal natation | Dormancy | | |
| 100 | — | 715(263) | 1 | 0 | 10 | 10 | 100 |
|  |  |  | 24 | 0 | 10 | 10 | 100 |
| 200 | — | 894(328) | 1 | 0 | 10 | 10 | 100 |
|  |  |  | 24 | 0 | 10 | 10 | 100 |
| 10 | 10(5.5) | 18(7) | 1 | 0 | 10 | 10 | 100 |
|  |  |  | 24 | 0 | 10 | 10 | 100 |
| 10 | 5(2.8) | 18(7) | 1 | 0 | 10 | 10 | 100 |
|  |  |  | 24 | 0 | 10 | 10 | 100 |
| 10 | 3(1.6) | 18(7) | 1 | 0 | 10 | 10 | 100 |
|  |  |  | 24 | 0 | 10 | 10 | 100 |

* The value in parenthesis shows the conversion concentration of hydrogen peroxide.
** The value in parenthesis shows the ferrous ion concentration.

TABLE 10

| Test chemical (mg/L) | | Contact time with test chemical (hr) | Behavior of plankton (number) | | Mortality of dormancy (number) | Death rate (%) |
| --- | --- | --- | --- | --- | --- | --- |
| Hydrogen peroxide | Catalase | | Normal natation | Dormancy | | |
| 10 | 0.2 | 1 | 0 | 10 | 9 | 90 |
|  |  | 24 | 0 | 10 | 10 | 100 |
| 20 | 2 | 1 | 0 | 10 | 10 | 100 |
|  |  | 24 | 0 | 10 | 10 | 100 |
| 50 | 2 | 1 | 0 | 10 | 10 | 100 |
|  |  | 24 | 0 | 10 | 10 | 100 |
| 100 | 20 | 1 | 0 | 10 | 10 | 100 |
|  |  | 24 | 0 | 10 | 10 | 100 |
| 200 | 200 | 1 | 0 | 10 | 5 | 50 |
|  |  | 24 | 2 | 8 | 5 | 50 |

TABLE 11

| Test chemical (mg/L) | | Contact time with test chemical (hr) | Behavior of plankton (number) | | Mortality of dormancy (number) | Death rate (%) |
| --- | --- | --- | --- | --- | --- | --- |
| Hydrogen peroxide | Potassium iodide * | | Normal natation | Dormancy | | |
| 10 | 0.13(0.1) | 1 | 0 | 10 | 9 | 90 |
|  |  | 24 | 0 | 10 | 10 | 100 |
| 20 | 1.3(1) | 1 | 0 | 10 | 10 | 100 |
|  |  | 24 | 0 | 10 | 10 | 100 |
| 50 | 13(10) | 1 | 0 | 10 | 10 | 100 |
|  |  | 24 | 0 | 10 | 10 | 100 |
| 100 | 131(100) | 1 | 0 | 10 | 10 | 100 |
|  |  | 24 | 0 | 10 | 10 | 100 |
| 200 | 1310(1001) | 1 | 0 | 10 | 8 | 80 |
|  |  | 24 | 1 | 9 | 8 | 80 |

* The value in parenthesis shows the iodine concentration.

TABLE 12

| Test chemical (mg/L) | Contact time with test chemical (hr) | Behavior of plankton (number) | | Mortality (number) | Death rate (%) |
|---|---|---|---|---|---|
| Hydrogen peroxide | | Normal natation | Dormancy | dormancy | |
| 10 | 1 | 2 | 8 | 7 | 70 |
| | 24 | 0 | 10 | 10 | 100 |
| 20 | 1 | 0 | 10 | 8 | 80 |
| | 24 | 0 | 10 | 10 | 100 |
| 50 | 1 | 0 | 10 | 10 | 100 |
| | 24 | 0 | 10 | 10 | 100 |
| 100 | 1 | 0 | 10 | 10 | 100 |
| | 24 | 0 | 10 | 10 | 100 |
| 200 | 1 | 0 | 10 | 10 | 100 |
| | 24 | 0 | 10 | 10 | 100 |
| Blank | — | 7 | 3 | 0 | 0 |

From the results shown in Tables 9 to 11, it is found that, when the specified amount of hydrogen peroxide and/or peracetic acid, and at least one type selected from among ferrous sulfate, catalase and potassium iodide were simultaneously used, the excellent effect of exterminating the plankton can be obtained.

Test Example 5

Test for Confirming the Effect of Biocide

*Escherichia coli* was coated on a plain plate NB algae medium as the test bacteria and incubated for 48 hours at 37° C. The thus-incubated *Escherichia coli* was inoculated in 10 mL of a liquid NB medium contained in an L shaped test tube and, then, pre-incubated for 18 hours in a vibrational incubator set at 37° C. The pre-incubated bacteria emulsion of 0.1 mL was inoculated to 10 mL of the liquid NB medium contained in the L shaped test tube and, then, subjected to a major incubation in the vibrational incubator set at 37° C. until the turbidity at a wavelength of 660 nm comes down to 0.5.

Into 10 mL of the liquid NB medium contained in an L shaped test tube, hydrogen peroxide (reagent: aqueous 30% by weight solution) and/or peracetic acid (reagent: containing 9% by weight; containing 1% by weight of hydrogen peroxide) and ferrous sulfate (reagent: 7 hydrates), catalase ("Asksuper"; the activity 50,000 unit/ml; available from Mitsubishi Gas Chemical Co., Inc.) or potassium iodide as the test chemicals in the respective concentrations as described in Table 13, to thereby obtain the test liquid. Into the thus-obtained test liquid, the bacteria emulsion which has been subjected to a major incubation was inoculated after being diluted such that viable count comes to be $1 \times 10^3$ (CFU/mL). 48 hours after inoculation, the viable count (CFU/mL) in the test liquid was measured. The results are shown in Table 13.

TABLE 13

| Test chemical (mg/L) | | | | | viable cell count (CFU/ml) | | | |
|---|---|---|---|---|---|---|---|---|
| | | | | | Contact time (hr) | | | |
| Hydrogen peroxide | Peracetic acid * | Ferrous sulfate ** | Catalase | Potassium iodide *** | 3 | 6 | 12 | 24 |
| 20 | — | 9(3) | — | — | 7.0 | 0 | 0 | 0 |
| 20 | — | 18(7) | — | — | 3.0 | 0 | 0 | 0 |
| 20 | — | 36(13) | — | — | 0 | 0 | 0 | 0 |
| 20 | — | 72(26) | — | — | 0 | 0 | 0 | 0 |
| 20 | — | 89(33) | — | — | 0 | 0 | 0 | 0 |
| 10 | — | — | 0.01 | — | $1.9 \times 10$ | 0 | 0 | 0 |
| 20 | — | — | 0.02 | — | 2.0 | 0 | 0 | 0 |
| 100 | — | — | 2 | — | 0 | 0 | 0 | 0 |
| 200 | — | — | 20 | — | 0 | 0 | 0 | 0 |
| 10 | — | — | — | 0.13(0.1) | 6.0 | 0 | 0 | 0 |
| 20 | — | — | — | 1.3(1) | 1.0 | 0 | 0 | 0 |
| 100 | — | — | — | 13(10) | 0 | 0 | 0 | 0 |
| 200 | — | — | — | 131(100) | 0 | 0 | 0 | 0 |
| 10 | — | — | — | — | $3.8 \times 10^3$ | $1.1 \times 10^2$ | $1.4 \times 10$ | 2.0 |
| 20 | — | — | — | — | $2.7 \times 10^3$ | $9.2 \times 10^2$ | $1.2 \times 10$ | 1.0 |
| 50 | — | — | — | — | 7.0 | 0 | 0 | 0 |
| 100 | — | — | — | — | 0 | 0 | 0 | 0 |
| 200 | — | — | — | — | 0 | 0 | 0 | 0 |
| 200 | — | — | 200 | — | $5.0 \times 10^3$ | $2.0 \times 10^4$ | $4.5 \times 10^4$ | $2.4 \times 10^5$ |
| 200 | — | — | — | 1310(1001) | $1.5 \times 10$ | $3.8 \times 10$ | $2.7 \times 10^2$ | $1.2 \times 10^3$ |
| 8 | 8(4.5) | 9(3) | — | — | $1.4 \times 10$ | 0 | 0 | 0 |
| 12 | 4(2.2) | 9(3) | — | — | $1.5 \times 10$ | 0 | 0 | 0 |
| 8 | 8(4.5) | 18(7) | — | — | $1.0 \times 10$ | 0 | 0 | 0 |
| 12 | 4(2.2) | 18(7) | — | — | $1.1 \times 10$ | 0 | 0 | 0 |
| 8 | 8(4.5) | — | — | — | $2.2 \times 10$ | 0 | 0 | 0 |
| 12 | 4(2.2) | — | — | — | $4.5 \times 10$ | $1.3 \times 10$ | 4 | 0 |
| 12 | — | — | — | — | $2.4 \times 10^3$ | $5.0 \times 10^2$ | $8.8 \times 10$ | $1.5 \times 10$ |
| — | 8(4.5) | — | — | — | $3.4 \times 10$ | 0 | 0 | 0 |
| | | | Blank | | $1.7 \times 10^5$ | $1.2 \times 10^5$ | $1.4 \times 10^6$ | $2.3 \times 10^6$ |

\* The value in parenthesis shows the conversion concentration of hydrogen peroxide.
\*\* The value in parenthesis shows the ferrous ion concentration.
\*\*\* The value in parenthesis shows the iodine concentration.

From the results shown in Table 13, it is found that, when the specified amount of hydrogen peroxide and/or peracetic acid, and at least one type selected from among ferrous sulfate, catalase and potassium iodide were simultaneously used, the excellent effect of biocides can be obtained compared with a case in which hydrogen peroxide, ferrous sulfate, catalase and potassium iodide were each individually used, another case in which hydrogen peroxide and peracetic acid are simultaneously used and still another case of blank (non-addition).

The present invention is related to Japanese Patent Application No. 2004-224403 filed on Jul. 30, 2004, and Japanese Patent Application No. 2004-242422 filed on Aug. 23, 2004, whose priory is claimed and the disclosures of which is incorporated reference in its entirety.

The invention claimed is:

1. A method for treating ship ballast water, said method comprising adding to the ship ballast water:
   (1) hydrogen peroxide or a compound producing hydrogen peroxide in an amount such that a hydrogen peroxide concentration in the ship ballast water is 10 to 500 mg/L, and
   (2) at least one chemical selected from the group consisting of:
      (a) ferrous ion or a compound supplying ferrous ion in an amount such that a ferrous ion concentration in the ship ballast water is 0.1 to 400 mg/L,
      (b) catalase in an amount such that a concentration of catalase in the ship ballast water is 0.5 to 2,500 unit/L, and
      (c) iodine or a compound supplying iodine in an amount such that an iodine concentration in the ship ballast water is 0.1 to 100 mg/L,
   such that organisms viable in the ship ballast water are exterminated and the concentration of dissolved oxygen in the ship ballast water is maintained at a level viable to said organisms.

2. The method for treating the ship ballast water according to claim 1, wherein said hydrogen peroxide is added such that its concentration in the ship ballast water is 10 to 300 mg/L, said ferrous ion, when added, is added such that its concentration in the ship ballast water is 0.1 to 100 mg/L, said catalase, when added, is added such that its concentration in the ship ballast water is 0.5 to 250 unit/L, and said iodine when added, is added such that its concentration in the ship ballast water is 0.1 to 10 mg/L.

3. The method for treating the ship ballast water according to claim 1, wherein said compound producing hydrogen peroxide is added to the ship ballast water and is selected from the group consisting of perboric acid, percarbonic acid, peroxysulfuric acid, peracetic acid, sodium perborate and sodium percarbonate.

4. The method for treating the ship ballast water according to claim 1, wherein said compound supplying ferrous ion is added to the ship ballast water and is selected from the group consisting of ferrous sulfate, ferrous chloride and ammonium ferrous sulfate.

5. The method for treating the ship ballast water according to claim 1, wherein said catalase is added to the ship ballast water and is selected from the group consisting of a resultant extracted article from a liver, a kidney and blood erythrocytes of a cow and a pig, and a resultant bacteria cultured article of Aspergillus niger and Micrococcus lysodeikticus, having a molecular weight of 100,000 to 500,000 and an activity of 10,000 to 100,000 unit/mL.

6. The method for treating the ship ballast water according to claim 1, wherein said compound supplying iodine is added to the ship ballast water and is selected from the group consisting of potassium iodide and ammonium iodide.

7. The method for treating the ship ballast water according to claim 1, wherein said hydrogen peroxide or a compound producing hydrogen peroxide and said at least one chemical selected from the groups consisting of said ferrous ion or a compound supplying ferrous ion, when added to the ship ballast water, said catalase, when added to the ship ballast water, and said iodine or a compound supplying iodine, when added to the ship ballast water, are diluted or dissolved with seawater or fresh water and are added to the ballast water.

8. The method for treating the ship ballast water according to claim 1, wherein said hydrogen peroxide or a compound producing hydrogen peroxide is allowed to be in contact with the ballast water for 3 to 40 hours.

9. The method for treating the ship ballast water according to claim 1, comprising adding hydrogen peroxide to the ship ballast water.

10. The method for treating the ship ballast water according to claim 1, comprising adding a compound producing hydrogen peroxide to the ship ballast water.

11. The method for treating the ship ballast water according to claim 1, comprising adding ferrous ion to the ship ballast water.

12. The method for treating the ship ballast water according to claim 1, comprising adding a compound supplying ferrous ion to the ship ballast water.

13. The method for treating the ship ballast water according to claim 1, comprising simultaneously adding hydrogen peroxide or a compound producing hydrogen peroxide and catalase to the ship ballast water.

14. The method for treating the ship ballast water according to claim 1, comprising adding iodine to the ship ballast water.

15. The method for treating the ship ballast water according to claim 1, comprising adding a compound supplying iodine to the ship ballast water.

16. The method for treating the ship ballast water according to claim 1, comprising adding (1) ferrous ion or a compound supplying ferrous ion in an amount such that a ferrous ion concentration in the ship ballast water is 0.1 to 400 mg/L and (2) catalase in an amount such that a concentration of catalase in the ship ballast water is 0.5 to 2,500 unit/L.

17. The method for treating the ship ballast water according to claim 1, comprising adding (1) ferrous ion or a compound supplying ferrous ion in an amount such that a ferrous ion concentration in the ship ballast water is 0.1 to 400 mg/L and (2) iodine or a compound supplying iodine in an amount such that an iodine concentration in the ship ballast water is 0.1 to 100 mg/L.

18. The method for treating the ship ballast water according to claim 1, comprising adding (1) catalase in an amount such that a concentration of catalase in the ship ballast water is 0.5 to 2,500 unit/L and (2) iodine or a compound supplying iodine in an amount such that an iodine concentration in the ship ballast water is 0.1 to 100 mg/L.

19. A method for treating ship ballast water comprising:
   adding hydrogen peroxide or a compound producing hydrogen peroxide to the ship ballast water in an amount such that the hydrogen peroxide concentration in the ship ballast water is 10-500 mg/L;
   adding a ferrous ion or a compound producing a ferrous ion to the ship ballast water in an amount such that the concentration of the ferrous ion in the ship ballast water is 0.1-400 mg/L;

adding catalase to the ship ballast water in an amount such that the concentration of catalase in the ship ballast water is 0.5-2,500 unit/L; and adding iodine or a compound supplying iodine to the ship ballast water in an amount such that the iodine concentration in the ship ballast water is 0.1-100 mg/L, such that organisms viable in the ship ballast water are exterminated and the concentration of dissolved oxygen in the ship ballast water is maintained at a level viable to said organisms.

* * * * *